United States Patent
Hanes et al.

(10) Patent No.: US 10,657,020 B2
(45) Date of Patent: May 19, 2020

(54) AUTOMATION AND AUGMENTATION OF LAB RECREATES USING MACHINE LEARNING

(71) Applicant: Cisco Technology, Inc., San Jose, CA (US)

(72) Inventors: Michael David Hanes, Lewisville, NC (US); Joseph Michael Clarke, Raleigh, NC (US); Charles Calvin Byers, Wheaton, IL (US); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 299 days.

(21) Appl. No.: 15/613,481

(22) Filed: Jun. 5, 2017

(65) Prior Publication Data

US 2018/0349247 A1 Dec. 6, 2018

(51) Int. Cl.
*G06F 11/34* (2006.01)
*H04L 29/08* (2006.01)
*H04L 29/14* (2006.01)

(52) U.S. Cl.
CPC .... *G06F 11/3409* (2013.01); *H04L 29/08018* (2013.01); *H04L 29/08027* (2013.01);
(Continued)

(58) Field of Classification Search
CPC ........... G06F 11/3409; H04L 29/08018; H04L 29/08027; H04L 29/08036
See application file for complete search history.

(56) References Cited

U.S. PATENT DOCUMENTS

| 7,665,071 | B1* | 2/2010 | Roles ................. | H04L 41/0233 717/104 |
| 8,751,450 | B1* | 6/2014 | Gaonkar ............. | H04L 43/10 707/634 |

(Continued)

OTHER PUBLICATIONS

Violino, Bob., "How many robots does it take to run your data center?", http://www.zdnet.com/article/how-many-robots-does-it-take-to-run-your-data-center/, 3 pages, Jul. 29, 2016, ZDNet, CBS Interactive.

*Primary Examiner* — Nicholas R Taylor
*Assistant Examiner* — Sanjoy K Roy
(74) *Attorney, Agent, or Firm* — Behmke Innovation Group LLC; James M. Behmke; Jonathon P. Western (57) ABSTRACT

In one embodiment, a server determines a particular computer network outside of a lab environment to recreate, and also determines, for the particular computer network, hardware components and their interconnectivity, as well as installed software components and their configuration. The server then controls interconnection of lab hardware components within the lab environment according to the interconnectivity of the hardware components of the particular computer network. The server also installs and configures lab software components on the lab hardware components according to the configuration of the particular computer network. Accordingly, the server operates the installed lab software components on the interconnected lab hardware components within the lab environment to recreate operation of the particular computer network within the lab environment, and provides information about the recreated operation of the particular computer network.

21 Claims, 8 Drawing Sheets

(52) U.S. Cl.
CPC ...... *H04L 29/08036* (2013.01); *H04L 67/125* (2013.01); *H04L 67/34* (2013.01); *H04L 69/40* (2013.01)

(56) References Cited

U.S. PATENT DOCUMENTS

| | | | |
|---|---|---|---|
| 8,904,241 | B2 | 12/2014 | Srivastava et al. |
| 9,449,278 | B2 | 9/2016 | Davlos et al. |
| 9,477,749 | B2 | 10/2016 | Mathew et al. |
| 9,908,239 | B1* | 3/2018 | O'Brien .................... B25J 9/02 |
| 2005/0204028 | A1* | 9/2005 | Bahl .................. H04L 41/0873 709/223 |
| 2009/0319249 | A1* | 12/2009 | White ............... G09B 19/0053 703/13 |
| 2010/0157516 | A1* | 6/2010 | Doorhy .............. H04L 41/0806 361/679.02 |
| 2011/0022694 | A1* | 1/2011 | Dalal ................ H04L 41/0843 709/222 |
| 2012/0084605 | A1* | 4/2012 | Shilon .................... H04L 43/12 714/33 |
| 2012/0189247 | A1* | 7/2012 | Chen .................... G02B 6/3508 385/22 |
| 2013/0184854 | A1* | 7/2013 | Bastian, II ............. B65G 61/00 700/217 |
| 2014/0279762 | A1 | 9/2014 | Xaypanya et al. |
| 2015/0232273 | A1* | 8/2015 | Jau .......................... H04L 67/16 700/218 |
| 2016/0107312 | A1* | 4/2016 | Morrill ................. B25J 9/1664 |
| 2016/0242053 | A1 | 8/2016 | Leontiadis et al. |
| 2018/0113728 | A1* | 4/2018 | Musani .................... G06F 8/65 |

* cited by examiner

AUTOMATION AND AUGMENTATION OF LAB RECREATES USING MACHINE LEARNING

TECHNICAL FIELD

The present disclosure relates generally to computer networks, and, more particularly, to automation and augmentation of lab recreates using machine learning.

BACKGROUND

Often, in order to solve complex customer problems in computer networking, some portion of a customer's network is recreated and tested in a lab. Lab recreates typically consume large amounts of manual engineering time by one or sometimes many network engineers. Some recreates can take days, and quite often the task of setting up the recreate environment can require more time than actually testing and figuring out the problem. The manual inefficiencies of this process are thus an expensive use of resources, both in terms of network engineer time and lab configuration time.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a server determines a particular computer network outside of a lab environment to recreate, and also determines, for the particular computer network, hardware components and their interconnectivity, as well as installed software components and their configuration. The server then controls interconnection of lab hardware components within the lab environment according to the interconnectivity of the hardware components of the particular computer network. The server also installs and configures lab software components on the lab hardware components according to the configuration of the particular computer network. Accordingly, the server operates the installed lab software components on the interconnected lab hardware components within the lab environment to recreate operation of the particular computer network within the lab environment, and provides information about the recreated operation of the particular computer network (e.g., in one embodiment, determining a root cause of a problem in the particular computer network based on the information about the recreated operation of the particular computer network).

According to one embodiment of the disclosure, the plurality of lab hardware components are pre-connected to a lab switch within the lab environment, and wherein interconnecting the selected set of the plurality of lab hardware components within the lab environment comprises establishing, through the lab switch, a virtualized interconnection between the selected set of the plurality of lab hardware components that mimics the interconnectivity of the plurality of hardware components of the particular computer network.

According to another embodiment of the disclosure, interconnecting the selected set of the plurality of lab hardware components within the lab environment comprises interconnecting the selected set of the plurality of lab hardware components within the lab environment via a lab patch panel within the lab environment in a configuration that represents the interconnectivity of the plurality of hardware components of the particular computer network.

According to still another embodiment of the disclosure, interconnecting the selected set of the plurality of lab hardware components within the lab environment comprises robotically retrieving a plurality of lab cartridges from storage for the lab environment, the plurality of lab cartridges collectively housing the selected set of the plurality of lab hardware components, robotically inserting the plurality of lab cartridges into one or more racks within the lab environment, and robotically interconnecting the plurality of lab cartridges via a lab patch panel within the lab environment in a configuration that interconnects the selected set of the plurality of lab hardware components within the lab environment according to the interconnectivity of the plurality of hardware components of the particular computer network.

Still further embodiments of the disclosure are described below, and the embodiments above are not meant to be limiting to the scope of the present disclosure.

Description

A computer network is a geographically distributed collection of nodes interconnected by communication links and segments for transporting data between end nodes, such as personal computers and workstations, or other devices, such as sensors, actuators, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), long distance wireless links, and others. Other types of networks, such as field area networks (FANs), neighborhood area networks (NANs), personal area networks (PANs), etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT provides the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network. Often, IoT networks operate within a shared-media mesh networks, such as wireless or PLC networks, etc. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using layers of devices at or near the network edge to provide application services to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Figure 1:
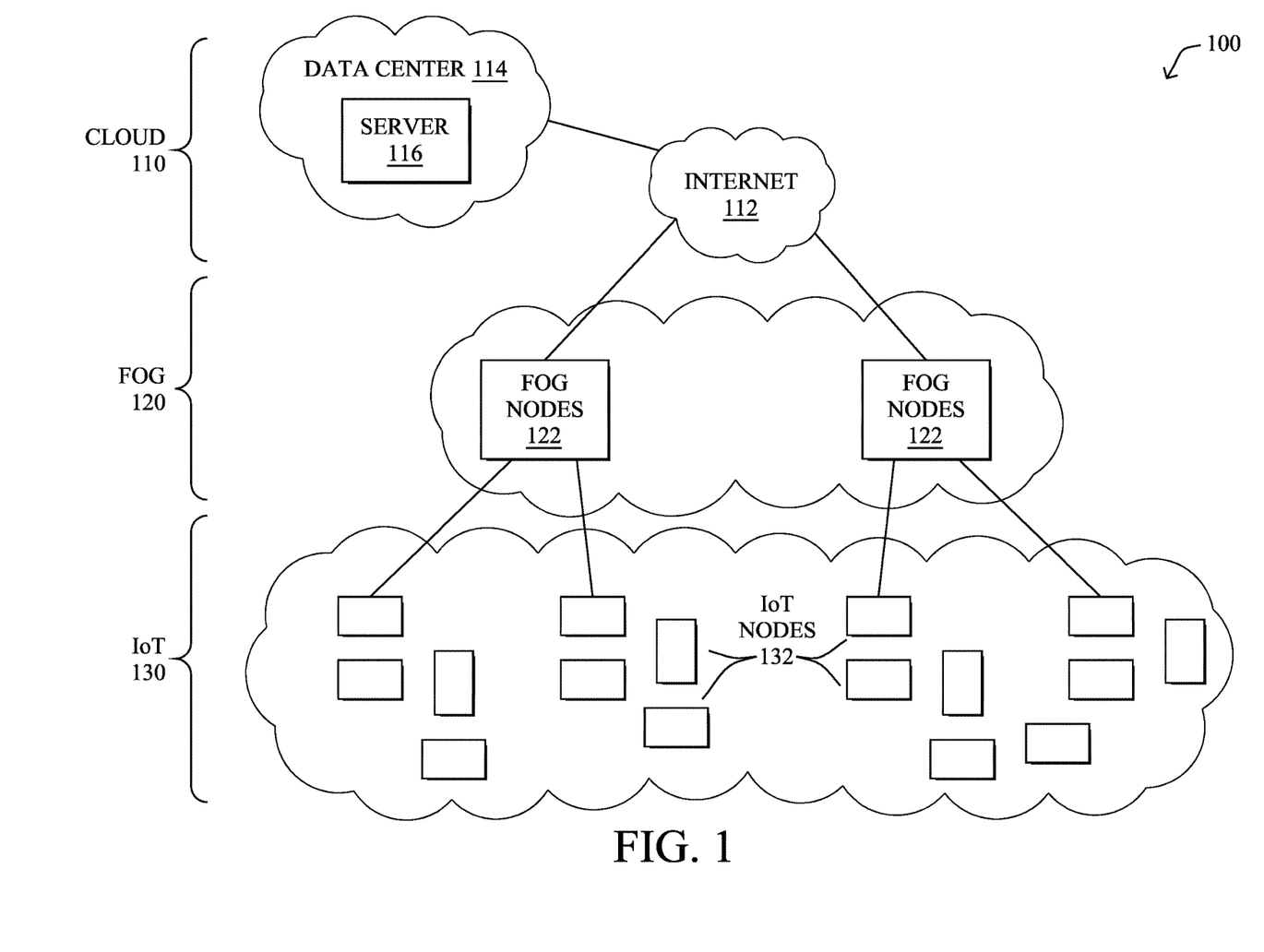
FIG. 1 illustrates an example computer network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, energy reserves, load factors, location, etc.

Specifically, as shown in the example network 100, three illustrative layers are shown, namely the cloud network 110, fog network 120, and IoT network 130 (with IoT nodes ("things" or "endpoints") 132). Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other. Resources in fog nodes 122 and the links surrounding them may be shared between different users, applications, organizations or tenants. This can cause a long-tail distribution in latency a given set of application data experiences as it passes through network 100, and the resulting load-dependent uncertainty in system performance is one of the motivations for using the techniques described below.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure. For example "real-world" computer networks may comprise any type of network, including, among others, Fog networks, IoT networks, cloud networks, core networks, backbone networks, data centers, enterprise networks, provider networks, customer networks, virtualized networks (e.g., virtual private networks or "VPNs"), combinations thereof, and so on. Also note that while one layer of fog nodes 122 is shown, the fog layer 120 can comprise a hierarchy of fog layers. Note further that the network environments and their associated devices may also be located in different geographic locations.

Figure 2:
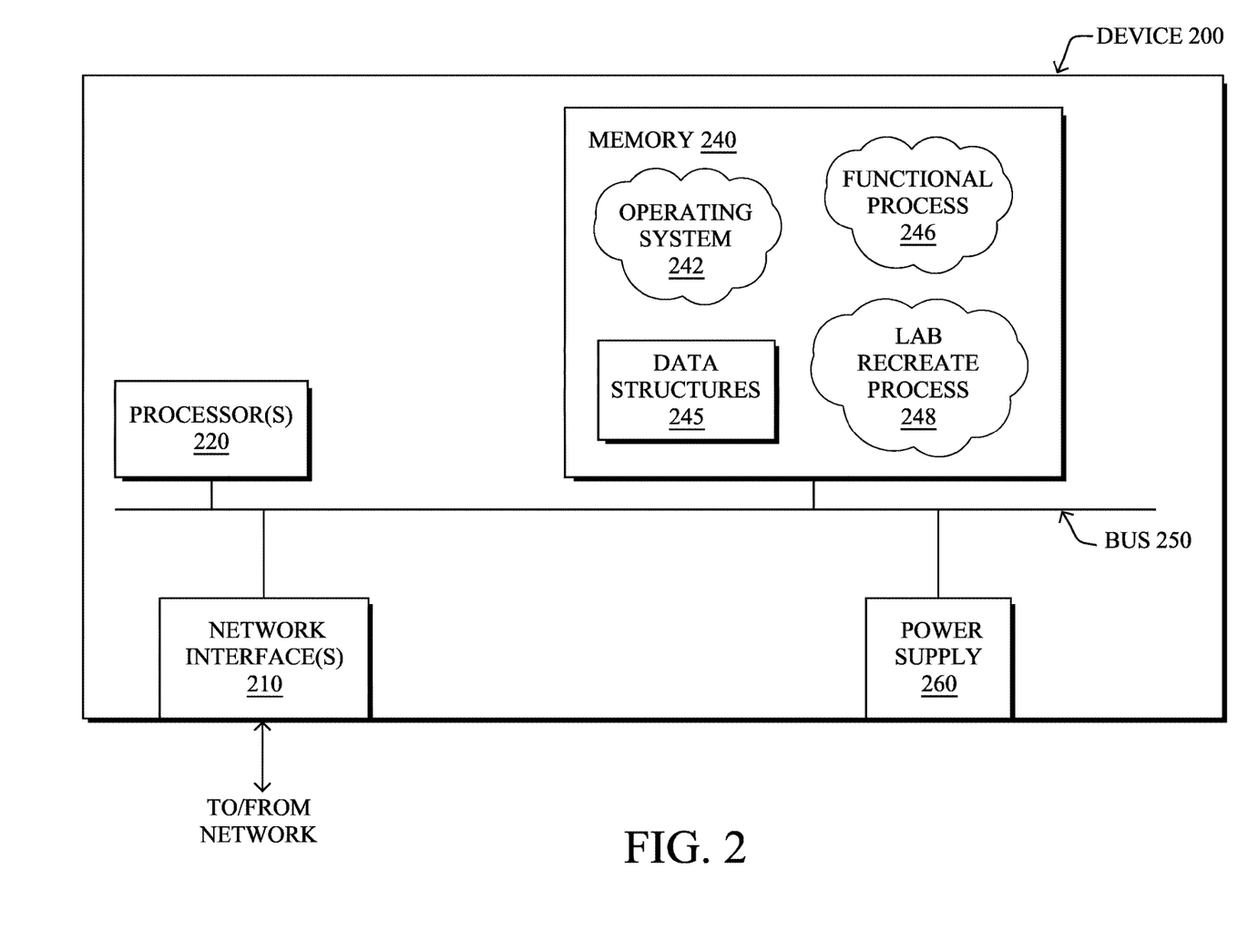
FIG. 2 illustrates an example network device/node.

FIG. 2 is a schematic block diagram of an example computing device 200 that may be used with one or more embodiments described herein e.g., as any of the devices shown in FIG. 1 above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, WiFi transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "lab recreate" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments as described below, the illustrative lab recreate process 248 may utilize machine learning techniques to perform various aspects of the techniques described below. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

——Automating Lab Recreates——

As noted above, solving complex customer problems in computer networking often requires recreating some portion of a customer's computer network in a lab for reexamination and testing. As also noted, lab recreates typically consume large amounts of manual engineering time and tie up lab resources for days or even longer, where the largest component of the time can often be attributed to setting up the recreate environment, rather than the testing and diagnosis. For instance, the network engineer has to reserve or "check-out" equipment in a lab, connect the equipment together, load the customer software (and firmware) versions, load the customer configurations, and then try and determine the root cause of a customer's problems (or perform other experimental configurations).

The techniques herein, therefore, look to improve the time necessary to set up a lab recreate and ultimately reach a determination based on the lab recreate (e.g., finding an answer to a customer's problem, confirming operation of a proposed computer network architecture and/or configuration). That is, the techniques herein increase the efficiency of recreating complicated network issues in a lab through Machine Learning techniques that are adapted to control automated robotics, particularly in one embodiment where newly defined equipment "cartridges" may be used to partially automate the building of physical lab recreates. This in turn leads to more time for the network engineers and/or customer service representatives to solve and address other customer problems, while at the same time allowing customers to still have their problems fixed more quickly.

Specifically, according to one or more embodiments of the disclosure as described in detail below, a server determines a particular computer network outside of a lab environment to recreate, and also determines, for the particular computer network, hardware components and their interconnectivity, as well as installed software components and their configuration. The server then controls interconnection of lab hardware components within the lab environment according to the interconnectivity of the hardware components of the particular computer network. The server also installs and configures lab software components on the lab hardware components according to the configuration of the particular computer network. Accordingly, the server operates the installed lab software components on the interconnected lab hardware components within the lab environment to recreate operation of the particular computer network within the lab environment, and provides information about the recreated operation of the particular computer network.

Illustratively, the techniques described herein may be performed by hardware, software, and/or firmware, such as in accordance with the illustrative "lab recreate" process 248, which may include computer executable instructions executed by the processor 220 to perform functions relating to the techniques described herein, e.g., in conjunction with one or more cooperating devices (e.g., a combination of learning machine servers, robotics controllers, user interface devices, load generators, test instruments, and so on).

Operationally, assume that a network engineer or service technician typically receives a customer query (e.g., a "case") with a network topology, configurations, and possibly debugs from the relevant customer devices and a defined problem that needs to be solved. Often a "lab recreate" is necessary to determine the root cause of the problem, that is, creating a copy of the customer's computer network in order to perform tests, debugging, reconfiguration, and so on, without disrupting the actual "real-world" customer network (or in some cases, to perform tests in a more controlled environment because the real-world network is malfunctioning). Another reason for lab recreates is to try new configurations (one or more parameters, such as hardware, software, traffic flows, numbers of users, and so on) before implementing them in the real-world networks.

According to the techniques herein, lab recreates are automated. In particular, in certain embodiments, the techniques herein address physically connecting devices in a lab to efficiently build a custom recreate environment (e.g., devices within a lab, which may span multiple physical locations, may be interconnected according to instructions to build the required recreate configuration). In certain embodiments, Machine Learning techniques may be implemented to offer problem solving, such as determining probable root causes, determining efficient lab storage configurations, and so on.

According to one or more embodiments herein, a server (e.g., server 116) may be configured with intelligence within the lab recreate process 248, such as one or more machine learning algorithms and/or processes configured for lab recreates. These machine learning (ML) algorithms, referred to herein as an "ML bot", have the intelligence to understand customer problems and to configure and perform the recreate. The ML bot not only gathers and processes the configuration information from customer records, it may also send queries directly to the customer equipment to find any configuration discrepancies or missing info as well as copying over customer traffic. The ML bot may look at previous cases, see if any patterns can be correlated, and recommend the best recreate lab configurations, best tests to run, and the most productive order to run them in. Typically, these recommendations require large amounts of time from even the most experienced experts. Machine learning, however, may be able to determine how much of the problem can be virtualized, if port numbers matter, if some resource inside the customer's equipment or network may be running low (which the techniques herein would help reproduce), environmental factors, etc., to better recreate the key aspects of the situation, and not spend resources to recreate parts of the customer's network that the ML bot thinks is unlikely to have a significant bearing on resolving the problem. By focusing on only the elements of the customer's network that the ML bot calculates are most likely to lead to the discovery of the problem's root cause, significant time and lab resources can be saved.

In certain embodiments, the lab ML bot can either run the physical tests and analyze the results, or simulate some or all of the network, and use that simulation to diagnose the problem. Often, hybrid models will be used on recreates, where the ML bot simulates a portion of the network, passes stimulus/responses to the physical equipment for other parts of the recreation. Also, the use of this capability may not necessarily be limited to only network engineers of a particular company. That is, a particular company's partners, suppliers, resellers, and even the customers themselves could be given highly controlled access to this capability of a network equipment provider's recreate lab to run the recreates themselves.

Ultimately, case data may be passed to a machine learning agent that can build a recreate and then test it in a way that is similar to the environment and reported condition(s). One way of doing this, as described below, would be to take an existing network and spinning up a virtual "mirror" of the network using the same operating system types and similar configurations. The ML bot could infer from a problem description that, say, specific load/latency/loss is needed on interfaces and creates packet generation and manipulation devices to do that. A network engineer could easily make tweaks to the recreate, but the ML bot has the intelligence to analyze the results as the recreate lab runs various scenarios, determine sensitivities, and hopefully solve or at least recreate the exact problem. Additionally, the ML bot is constantly learning from successful recreates and any engineer tweaks so that it gets better and better at recommending configurations and recreating problems.

For instance, the lab ML bot knows typical customer problems, such as slow response, applications hanging, choppy voice, and so on. So, when these problems are "read" from the case, the bot knows not only what components are important for a recreate but also how to best test the recreate. A large set of problem types may not have obvious solutions, and these are where this ML-based recreate system can improve current recreate processes. From this problem determination, additional machine learning may allow for the identification of critical recreate components and how they should be tested (e.g., inject packet loss, route flaps, etc.), what order tests should be run, and so on.

Figure 3:
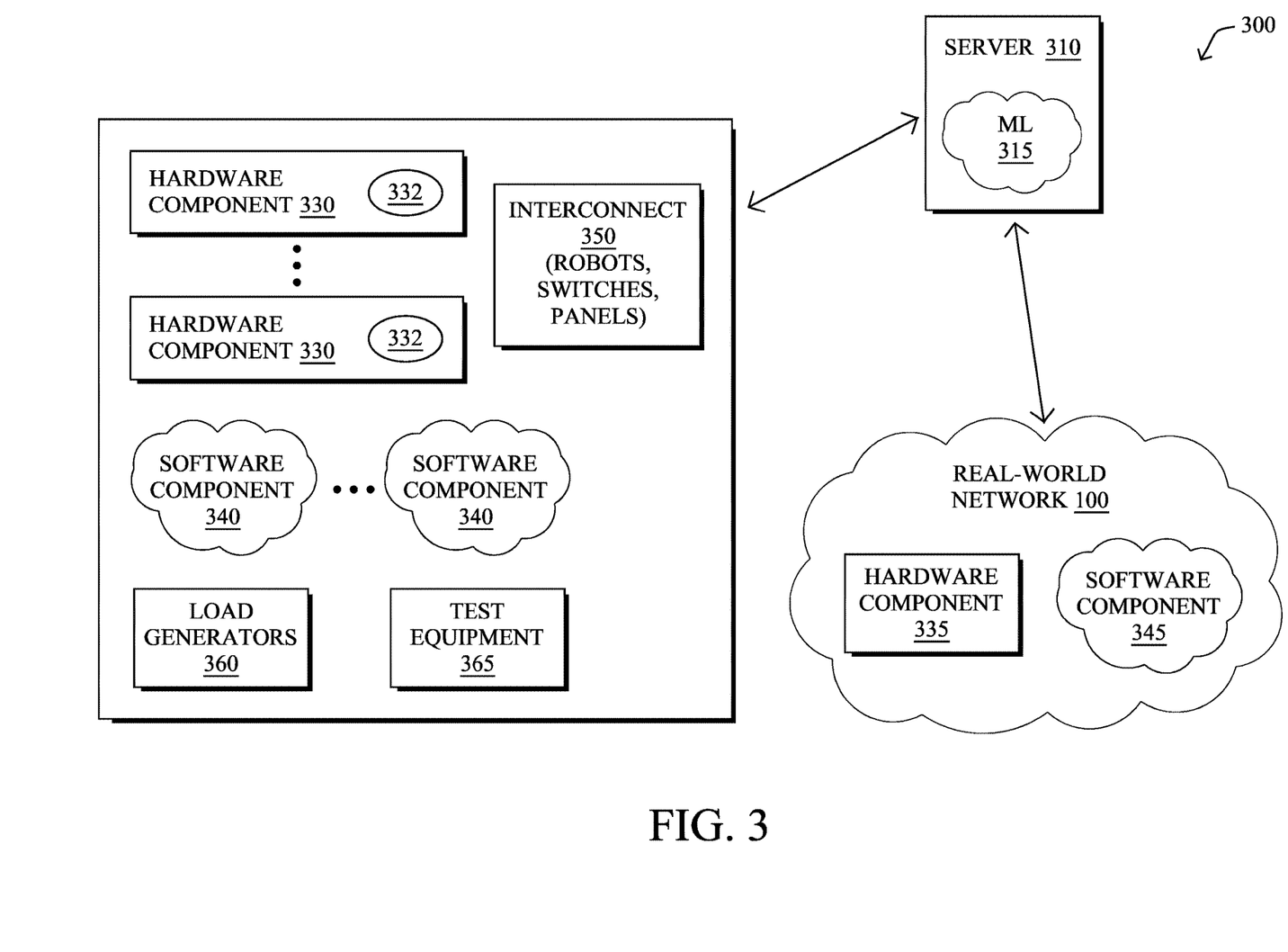
FIG. 3 illustrates an example lab recreate environment.

FIG. 3 illustrates an example 300 where a server 310, illustratively with machine learning components 315 (e.g., lab recreate process 248), communicates with a "real-world" network 100, which may be any sort of network with any particular configuration, as noted above. The server 310 also communicates with a lab environment 320, which as described below, comprises a plurality of lab hardware components 330 (e.g., with buttons 332 described below), a plurality of lab software components 340 (e.g., a store of available software programs, versions, etc.), and some type of interconnect 350 (e.g., switches, patch panels, robotic systems to connect devices, and so on). Lab environment 320 may also comprise one or more load generators 360 and/or test equipment 365. As detailed herein, certain subsets of the lab hardware and software may be interconnected specifically to mimic/represent hardware components 335 and software components 345 of a particular real-world network 100 (outside of the lab environment 320).

Figure 4A:
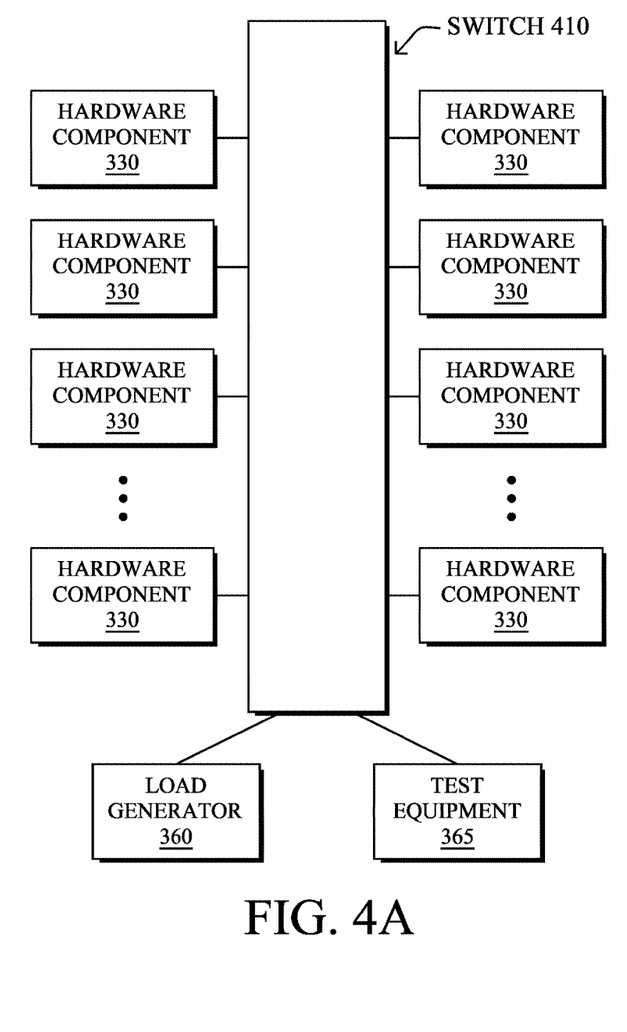
FIGS. 4A-4B illustrate an example interconnection within the lab recreate environment.
Figure 4B:
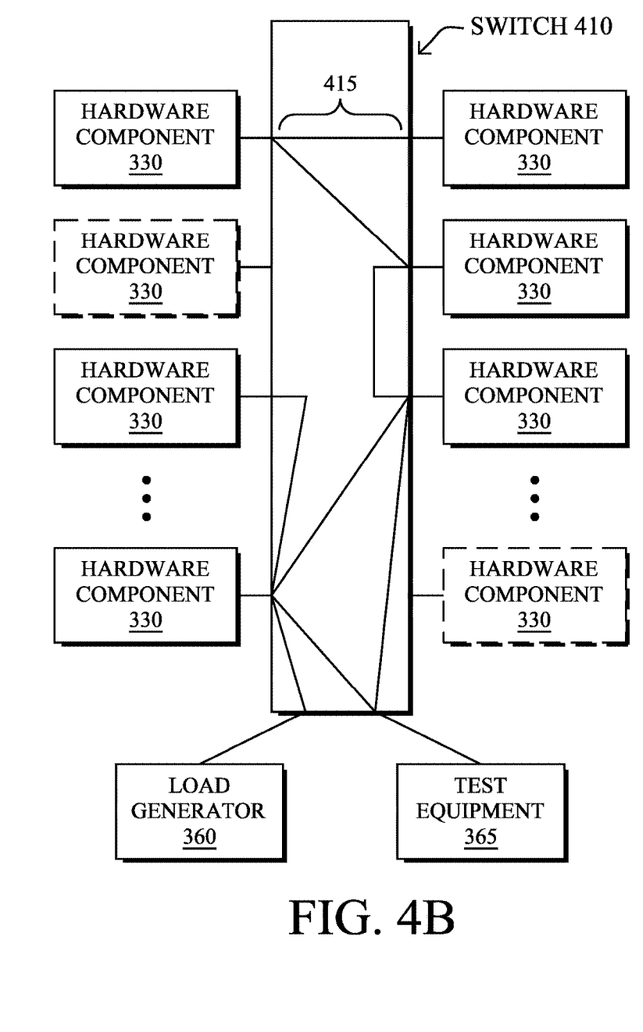

In a first embodiment, with reference to FIGS. 4A-4B, all possible types of equipment (hardware components 330) are installed in a large machine room (lab environment 320) and their network ports are permanently connected into a large switch 410 to virtualize the interconnect between boxes. As such, the server (e.g., ML bot) electronically sets the switch 410 to create interconnects 415 between the devices in use to mimic the configuration of the customer's network 100 (interconnection between hardware devices 335), and loads the required software versions 340 and configurations into the included boxes (to mimic real-world software 345). During operation of the established lab recreate environment, various tests may be performed with various sensors (e.g., traffic monitoring, cameras on device indicators such as LEDs, protocol analyzers, etc.) to determine the state of the recreated network, where load generators 360 may be used by the server to stimulate the network (e.g., based upon traffic patterns captured from the real network, selected by the server, etc.). The server may then analyze the activity of the lab environment using test instruments 365, and may generate various reports, or may even attempt to determine a root cause of any problems reported by the customer and/or network engineer.

Figure 5A:
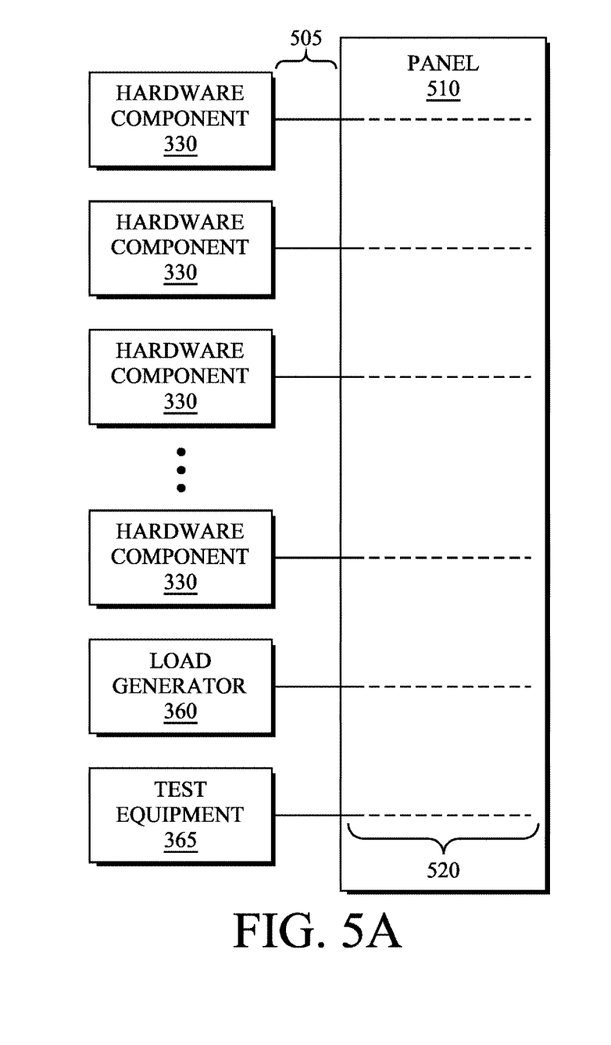
FIGS. 5A-5B illustrate another example interconnection within the lab recreate environment.
Figure 5B:
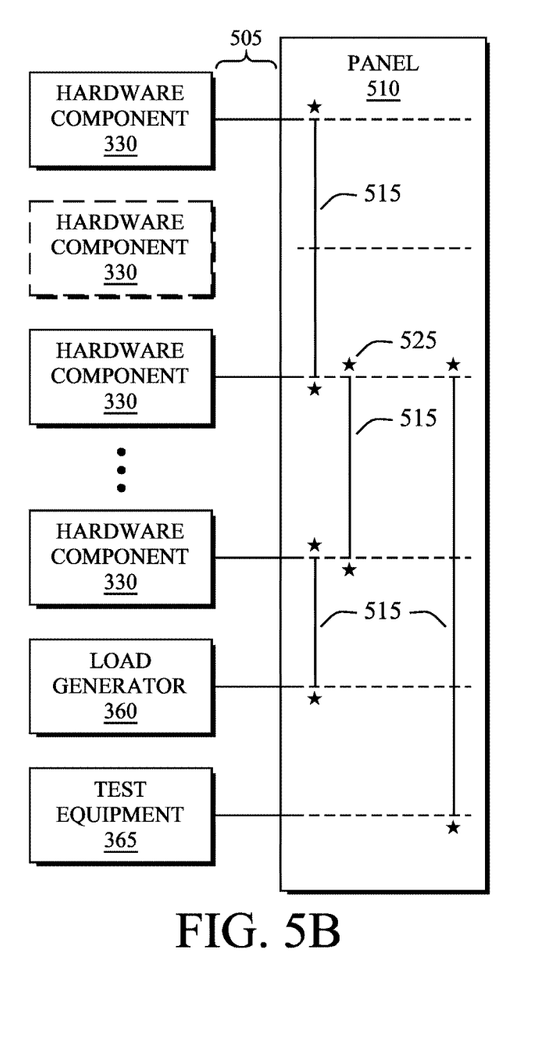

In a second embodiment, as shown in FIGS. 5A-5B, similar to the embodiment above in FIGS. 4A-4B, a large central switch 410 is replaced with a patch panel 510 where physical cables may be configured to interconnect selected hardware components 330 from all over the lab 320 (e.g., relocated to the patch panel, or else simply connected by cables from their stored locations). In one embodiment, there may be two sets of cables: one set of cables 505 permanently connecting the ports of hardware components 330 to the panel 510, and the set of recreate-specific cables 515 that are added to start the recreate and removed once it is complete. That is, server 310 selects the required set of lab hardware 330 for the recreate, and generates orders for how to configure the patch panel 510 with recreate-specific cables 515. This patch panel could be manual with a technician connecting up the ports (perhaps with a video projection or LEDs 525 as shown in FIG. 5B for guidance in selecting the appropriate patch cables and connecting them to the correct ports 520), or robotic (where automated systems plug in the cables). As the traffic does not need to flow through the large centralized switch 410 of embodiment above in FIGS. 4A-4B, this embodiment is closer to the real network 100, and may catch lower level problems like race conditions, synchronization issues, or layer 1 problems more adequately.

Figures 6A, 6B:
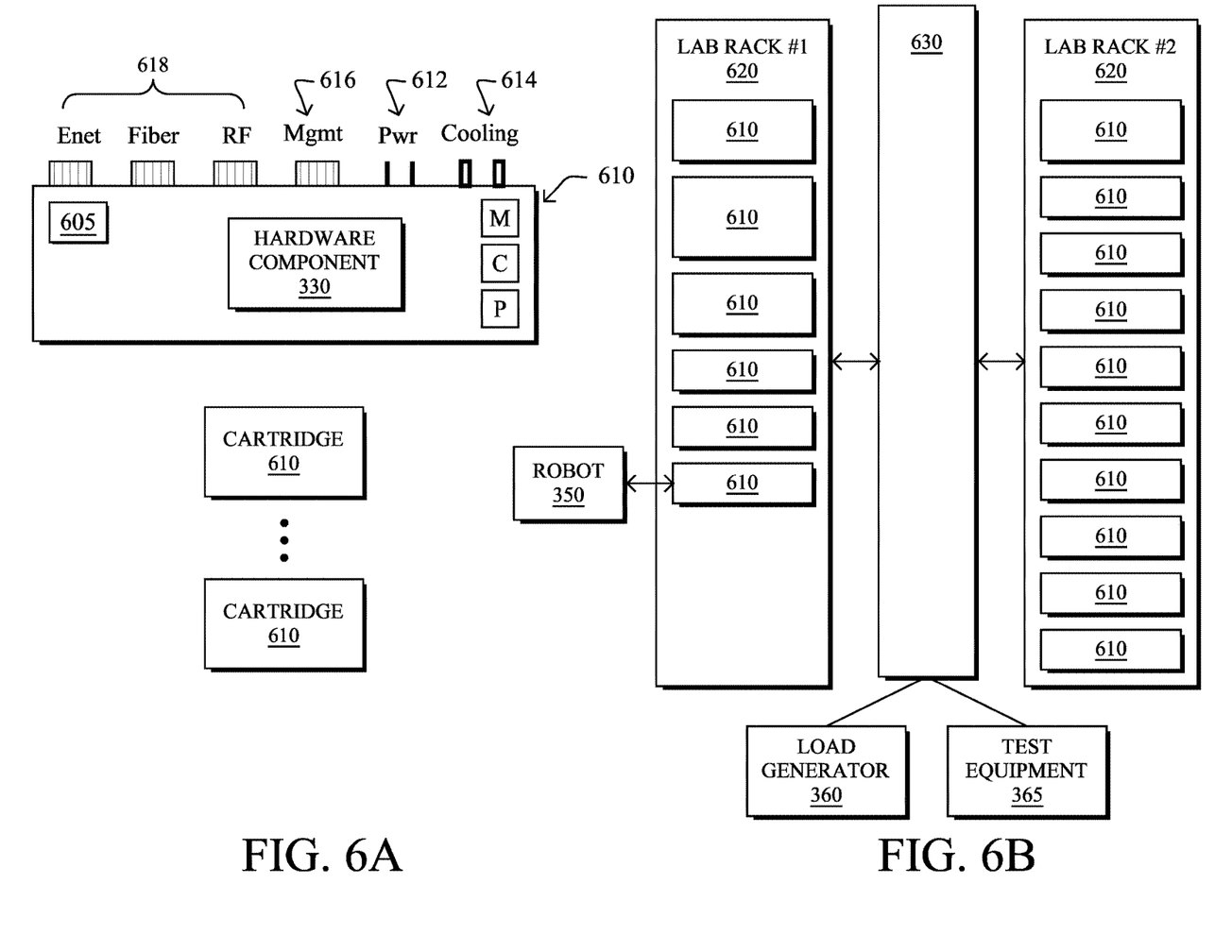
FIGS. 6A-6B illustrate still another example interconnection within the lab recreate environment.

In still another embodiment, as shown in FIGS. 6A-6B, all possible available types of hardware may be installed into a few sizes of standardized "cartridges" 610 that are stored unpowered in a warehouse. Each cartridge 610 includes a specific version of a specific hardware component/product 330, along with physical mounting support, network connections 618 (e.g., Ethernet ports, fiber ports, radio frequency/wireless ports, and so on), power connections 612, cooling interfaces 614, and management interfaces 616. There also may be actuators inside the cartridge to press buttons 332 on the contained equipment, and cameras to read indicator LEDs or front panel displays remotely.

In this embodiment, when commands come in from the server to configure a recreate network, a warehouse robot (a specific implementation of an "interconnect system" 350) goes to the warehouse, fetches the required cartridges containing the equipment the server specified, and brings them to one of several adjoining labs. The robot slides the cartridges 610 into special racks 620, where the network, power, cooling, and management connections are automatically made (e.g., "blind mating"). A robot patch panel 630 completes the interconnections between cartridges 610 and the lab's permanent infrastructure (e.g., load generators 360 and test equipment 365, such as protocol analyzers, endpoint equipment, simulators, RF test instruments, etc.). ML-based configurations may then be loaded into the equipment within the cartridges, and ML-specified loads and tests are applied to the network. When the test is done, the cartridges are returned to the warehouse and the patch panel is cleared, again by robots. Any type of robotic control system may be used in accordance with the techniques here, such as various rail/rack systems, autonomous moving robots with device holding capabilities (e.g., arms, grips, slots, etc.), and so on.

Note that cartridges 610 could even contain gear made by competitors, and could be integrated into the labs without the competitor having physical access to the labs, or without the lab company being able to open sealed cartridges to see potentially proprietary competitor equipment. For instance, where the lab 320 may be controlled or otherwise associated with a first entity (e.g., company, school, organization, etc.), the cartridges 610 may be closed cartridges encapsulating hardware components therein, where in one embodiment, the hardware components are associated with a second entity (e.g., competitor). That is, in certain embodiments, competitors' equipment can be securely integrated into recreates, without the competitors needing access to the lab 320, where the competitors could potentially seal their cartridges 610 to prevent unwanted inspection of the competitors' equipment 330.

Unlike the previous two embodiments, where a limited number of tests could be run concurrently through switch 410 or patch panel(s) 510, this third embodiment may be able to divide a lab warehouse full of equipment in a manner that is efficiently shared perhaps among a few dozen cartridge rack labs. This would thus increase the facility's throughput, sharing its common equipment and robots, improving its energy use, and better accommodating special cases (for example, networks that use rarer equipment combinations or problems that require large numbers of specific types of boxes).

Notably, in this particular embodiment, various descriptors and/or meta-data could be attached to these cartridges 610 that describe the equipment inside and its input and output functionality. These markings should be machine readable, to allow the automated system to ensure it is installing the right equipment. This information could provide interfaces, features, model numbers, power and cooling requirements, management capabilities, and so on. For example, the marking could indicate this cartridge is a particular firewall with three DMZ interfaces and one inside interface, requires 120V, 3 A, and listing the set of features are available. This data could be communicated through a variety of methods including bar codes or QR symbols on the cartridge, or RFID tags. These markings may also carry limited information, so the server and warehouse robots consult a database to look up the full details of the contents of each cartridge. NFC (Near Field Communication), VLC/optical interfaces, Bluetooth®, or USB ports on the cartridges could allow an extended dialogue between the server and the contents of a cartridge to perform more sophisticated configuration planning prior to their installation in the lab.

In one particular embodiment, the cartridge 610 as shown in FIG. 6A may be a closed/sealed box large enough to contain a piece of gear under test (hardware component 330)—typically in a 19" rack mounted form factor. It includes power, cooling and management elements (labeled "P", "C", and "M") needed to adapt the front/back panel connections on the gear to a common external format used by this system. Cartridge 610 may also have an array of blind mate connectors ("network interconnect element") to accept the Ethernet, Fiber, Radio, Management Power and Cooling interfaces from the device within the cartridge and present them to the backplane infrastructure of a lab rack 620. Generally, these connectors are called "blind mate" because when the robotic equipment slides a cartridge into a lab rack position, they self-align, and automatically make all these connections without human intervention. A few dozen Ethernet (e.g., CAT7 or better) connectors are available for metallic Ethernet. A few dozen fiber connections support any optical interfaces on the equipment in the cartridge. Coaxial cable connections bring any radio interfaces out of the cartridge. A management bus brings out any management interfaces (console, alarm, timing, etc.) and also allows the lab's support equipment to connect with the support elements within the cartridge. A few power options exist to get up to approximately 1 KW into the cartridge. These could be 120/240 AC and 48 VDC. Finally, there is a cooling connection between the external lab's cooling equipment and the cooling environment within the sealed cartridge. There could be a couple of options for this, including cold air in and hot air out ducts, or a fluid cooling loop connected to an internal heat exchanger.

FIG. 6B further illustrates two examples of lab racks, in this case simultaneously configured to recreate two customer network problems. Rack #1 has three sizes of cartridges (perhaps the largest one holding equipment up to 8 U in size, two medium ones holding equipment up to 4 U, and three small ones holding equipment up to 2 U). Lab Rack #2 holds one medium cartridge for equipment up to 4 U, and nine small ones sized for 2 U equipment. All these cartridges may have been automatically fetched from a warehouse and slid into the racks by robotic equipment under control of the ML system, as described herein. Selection, transport, installation and configuration of all the cartridges in a sophisticated recreate environment may thus be fully automated by the techniques herein, allowing a large recreate lab to be run with minimal human staff—or even fully lights-out (no human interaction whatsoever).

According to one or more specific embodiments herein, the techniques herein may be expanded to support different levels of modularity beyond the cartridges optimized for 19' rack mounted equipment described above. For example, whole rooms of a lab could be equipped with floor-mounted blind mate connectors (basically a large version of the cartridge connectors described above). Larger scale robots could fetch whole racks from the warehouse (either pre-configured with equipment, including equipment too big to fit the largest cartridge, or empty ready to accept a complement of cartridges), and place them on designated spaces in the lab. In one or more embodiments, there may also be a smaller packaging granularity of sub-cartridges or sub-components 605 (see FIG. 6A). A large cartridge 610 could have a number of smaller slots into which a robot will install pre-packaged smaller items (sub-components 605). This may be ideal for smaller network devices used in large numbers like Wi-Fi APs or security cameras. Network endpoint devices like smartphones, IoT sensors, digital media players, set-top boxes, etc. could naturally fit into sub-cartridges. This allows the quick creation of network recreates that have dozens or hundreds of endpoints or IoT "Things" in them. A medium sized (e.g., 4 U) cartridge may have enough room inside for sub-cartridges carrying several dozen iOS or Android smartphones. Configuring this manually would be vastly time consuming. As such, for increased modular flexibility, the techniques herein can package racks 620 into an empty lab room 320, which accept cartridges 610 containing 19" rack mounted equipment, which can further accept sub-cartridges 605 full of smaller sized network elements.

Note that a machine learning implementation is specifically contemplated herein with respect to these cartridges 610 and modular racks 620 (and sub-cartridges 605). Machine learning can predict the layout of racks and cartridges in a manner that increases the efficiency of building recreates. For example, certain cartridges are often deployed together and could be possibly stored close to one another in the warehouse. Machine learning could thus determine if certain racks should be pre-staged with cartridges that are found to be used the most in recreates. Machine learning could also predict to an extent based on past recreates and current environment (e.g., retail networks frozen between Thanksgiving and Christmas) what recreates are most probable and already have those cartridges close to racks for builds, or pre-configured and ready to go in anticipation of problems likely to arrive soon. Thus, machine learning may be specifically applied herein to the overall infrastructure to increase efficiency, determine the most common cartridge pairings, help predict recreate scenarios, help optimize the order of tests, and configure the network elements and text data to exactly match a customer network.

Figure 7A:
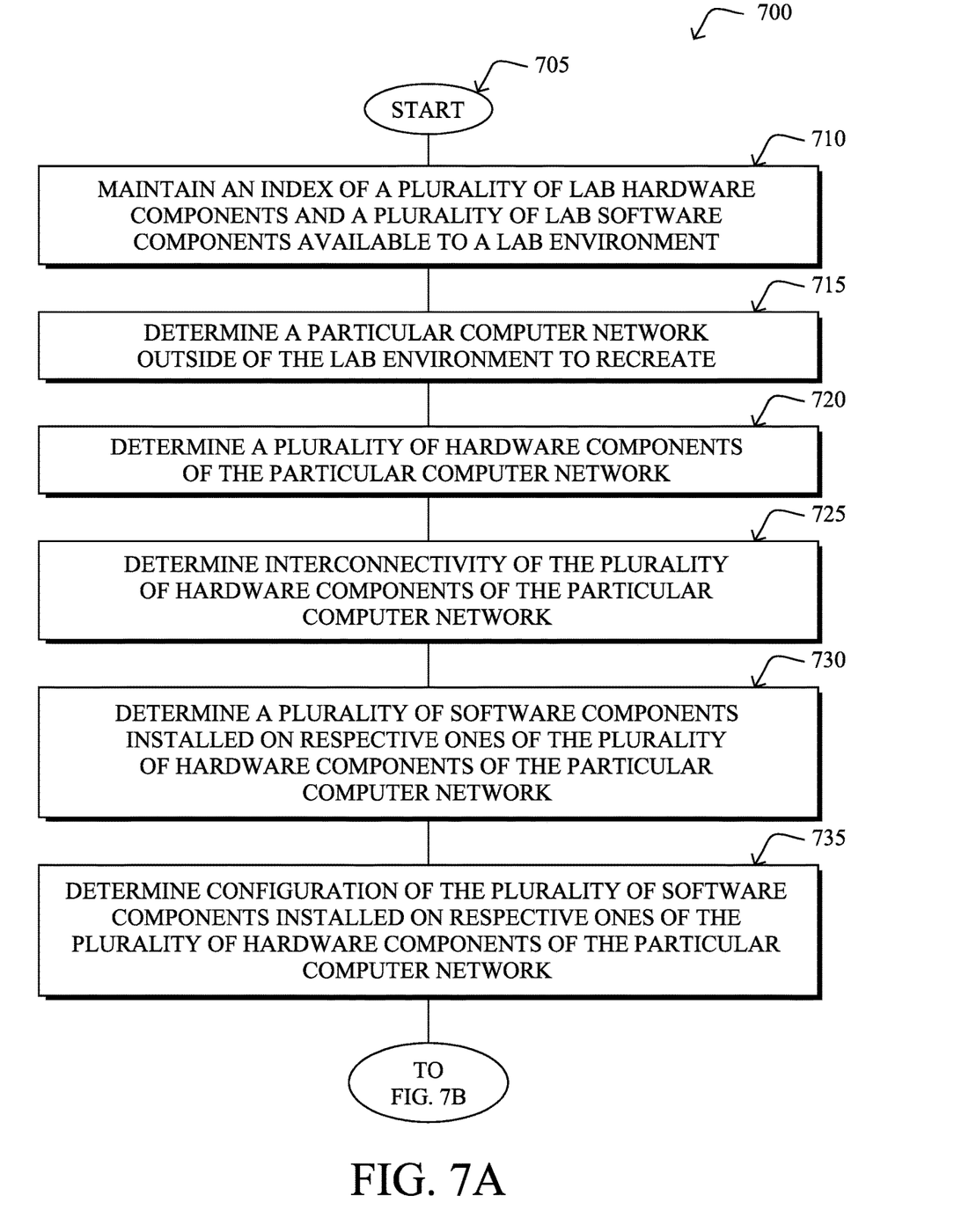
FIGS. 7A-7B illustrate an example simplified procedure for automated lab recreates.
Figure 7B:
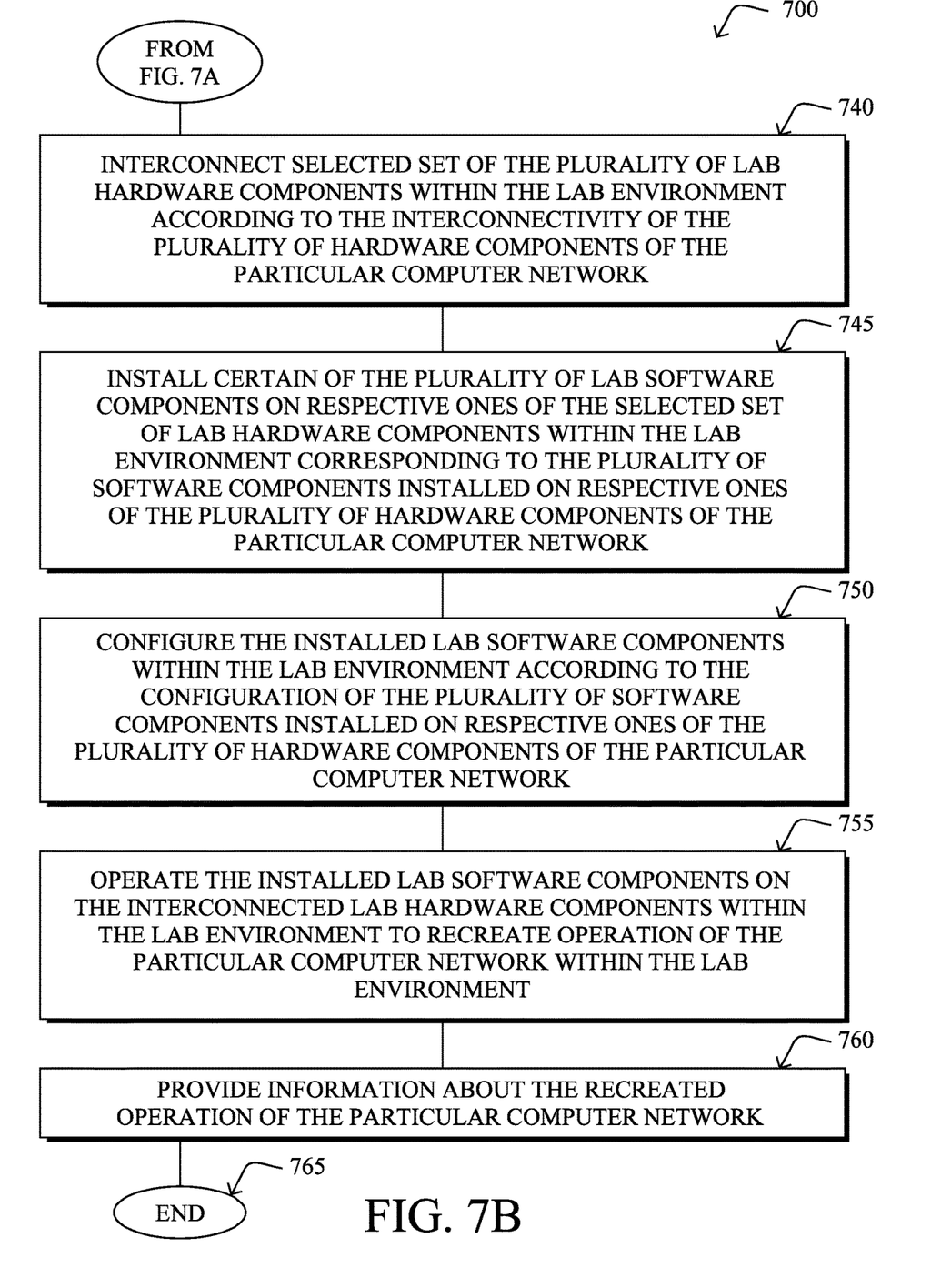

FIGS. 7A-7B illustrate an example simplified procedure for automated lab recreates in accordance with one or more embodiments described herein. For example, a non-generic, specifically configured device (e.g., device 200, such as a server 310) may perform procedure 700 by executing stored instructions (e.g., process 248). The procedure 700 may start at step 705, and continues to step 710, where, as described in greater detail above, a server 310 maintains an index of a plurality of lab hardware components 330 and a plurality of lab software components 340 available to a lab environment 320. In step 715, the server determines a particular computer network 100 outside of the lab environment to recreate, such as in response to a customer problem, a network engineer request, etc.

As described above, the server determines, in step 720, a plurality of hardware components 335 of the particular computer network 100, and the interconnectivity of the plurality of hardware components of the particular computer network in step 725. Furthermore, the server determines, in step 730, a plurality of software components 345 installed on respective ones of the plurality of hardware components of the particular computer network, and configuration of the plurality of software components installed on respective ones of the plurality of hardware components of the particular computer network in step 735.

According to the techniques described herein, in step 740 the server interconnects a selected set of the plurality of lab hardware components 330 within the lab environment 320 according to the interconnectivity of the plurality of hardware components 335 of the particular computer network 100. Notably, as described above, step 740 may be based on a number of different embodiments.

For instance, in one embodiment, as shown in FIGS. 4A-4B, the plurality of lab hardware components are pre-connected to a lab switch (interconnect 410) within the lab environment 310, and interconnecting the selected set of the plurality of lab hardware components within the lab environment comprises establishing, through the lab switch, a virtualized interconnection 415 between the selected set of the plurality of lab hardware components 330 that mimics the interconnectivity of the plurality of hardware components 335 of the particular computer network 100.

In another embodiment, as shown in FIGS. 5A-5B, interconnecting the selected set of the plurality of lab hardware components within the lab environment comprises interconnecting the selected set of the plurality of lab hardware components within the lab environment via a lab patch panel 510 within the lab environment in a configuration that represents the interconnectivity of the plurality of hardware components of the particular computer network. For instance, as mentioned above, in one embodiment, the server 310 may assist in providing visual guidance on the lab patch panel for a manual user to interconnect the selected set of the plurality of lab hardware components within the lab environment via the lab patch panel within the lab environment in a configuration that represents the interconnectivity of the plurality of hardware components of the particular computer network, and then may confirm the interconnecting of the selected set of the plurality of lab hardware components within the lab environment according to the interconnectivity of the plurality of hardware components of the particular computer network. In another embodiment, as described above, the server commands robotically interconnecting the selected set of the plurality of lab hardware components within the lab environment via the lab patch panel within the lab environment in a configuration that represents the interconnectivity of the plurality of hardware components of the particular computer network.

In still another embodiment for step 740, as shown in FIGS. 6A-6B, interconnecting the selected set of the plurality of lab hardware components within the lab environment comprises robotically retrieving a plurality of lab cartridges 610 (e.g., closed cartridges encapsulating hardware components therein) from storage for the lab environment 320, the plurality of lab cartridges collectively housing the selected set of the plurality of lab hardware components 330, robotically inserting the plurality of lab cartridges into one or more racks 620 within the lab environment (e.g., blind mating one or more of a power element 612, a cooling element 614, and a management element 616 of the plurality of lab cartridges with a corresponding element on the one or more racks), and robotically interconnecting the plurality of lab cartridges via a lab patch panel 630 within the lab environment in a configuration that interconnects the selected set of the plurality of lab hardware components within the lab environment according to the interconnectivity of the plurality of hardware components of the particular computer network. Note that in this embodiment, the plurality of lab cartridges may also be robotically returned to storage upon completion of operating.

Note further that according to this embodiment, selecting the plurality of lab cartridges to robotically insert is based on one or both of pre-installed or pre-configured lab software components corresponding to the plurality of software components of the particular computer network. That is, there may be a plurality of cartridges with hardware A, though one may have pre-installed software version 1, and another may have pre-installed software version 2. In still another embodiment as described above, at least a portion of the plurality of lab cartridges 610 are pre-inserted into one or more particular racks 620, such that robotically retrieving the plurality of lab cartridges from storage comprises robotically retrieving the particular racks with pre-inserted lab cartridges, and then robotically inserting the plurality of lab cartridges comprises robotically inserting the particular racks into the lab environment. (Note that in one example embodiment, as opposed to multi-cartridge installation, this rack-level move may also or alternatively be performed in order to accommodate equipment that may be too big to fit within a cartridge, such as a very large router or other large form factor network device). In still a further embodiment, one or more hardware sub-components 605 may be robotically inserted into one or more of the plurality of lab cartridges 610.

In step 745, the server installs (if not pre-installed) certain of the plurality of lab software components 340 on respective ones of the selected set of lab hardware components 330 within the lab environment 320 corresponding to the plurality of software components 345 installed on respective ones of the plurality of hardware components 335 of the particular computer network 100. Also, in step 750, the server further configures the installed lab software components 340 within the lab environment according to the configuration of the plurality of software components 345 installed on respective ones of the plurality of hardware components of the particular computer network.

Once the lab environment is configured, in step 755 the server may operate the installed lab software components 340 on the interconnected lab hardware components 330 within the lab environment 320 to recreate operation of the particular computer network 100 within the lab environment. Note that in certain embodiments, the techniques herein may robotically press one or more buttons 332 on the lab hardware 330 within the lab environment 320 while operating the installed lab software components 340 on the interconnected lab hardware components within the lab environment to recreate operation of the particular computer network 100 within the lab environment.

According to one particular embodiment, the server 310 (particularly machine learning components thereof) may determine a root cause of a problem in the particular computer network based on the information about the recreated operation of the particular computer network. In another particular embodiment, the server may adjust one or more parameters of the lab environment (e.g., interconnected lab hardware components, interconnection of the interconnected lab hardware components, installed lab software components, configuration of the installed lab software components, network traffic within the lab environment, software protocol messages, command line interface (CLI) commands, etc.), and determines an effect of the adjusted one or more parameters on operation of the lab environment (e.g., a lab recreate to examine hypothetical scenarios).

In step 760, the server provides information about the recreated operation of the particular computer network, such as various values, statistics, information about the effect of the adjusted one or more parameters on operation of the lab environment, possible solutions or suggested actions to solve a customer's problem, and so on. In step 765, the procedure illustratively ends, notably with the option to produce further lab recreates. Note that in one embodiment, as described above, the server may also command robots/interconnect 350 dismantle hardware components 330 and determine an optimal storage arrangement of the lab cartridge storage for the lab environment based on efficiency of configuring the lab environment to recreate operation of computer networks.

It should be noted that while certain steps within procedure 700 may be optional as described above, the steps shown in FIGS. 7A-7B are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for automated lab recreates that save valuable time and resources. In particular, the techniques herein allow network engineers to quickly reach conclusions (e.g., solving problems, confirming redesigns, etc.), further allowing them to work on other critical issues (e.g., additional cases). For instance, certain embodiments herein would allow for a fully "lights-out" operation, where ML operation and robotic controls allow for an autonomous system, providing results, statistics, suggestions, and so on, based on detected problems/errors, customer requests, or network engineer commands. In addition, the techniques herein provide increased lab throughput (i.e., the ability to test more recreate environments per day per lab), more accurate recreates, and the ability to configure, run, and monitor a recreate lab from anywhere in the world, particularly without concerns for security or downtime of working with real-world systems.

While there have been shown and described illustrative embodiments that provide for automated lab recreates, it is to be understood that various other adaptations and modifications may be made within the spirit and scope of the embodiments herein. For example, while certain embodiments are described herein with respect to certain network types, configurations, devices, the techniques are not limited to only those embodiments mentioned above and may be used with any computer networks, generally (e.g., Fog, IoT, enterprise, service provider, and so on). In addition, while certain physical configurations are shown (e.g., cartridges, blind connections, etc.), other physical configurations may be used, accordingly. For example, different modularity approaches could allow custom recreate lab configurations at the rack level, the cartridge level, or sub-cartridge levels, all done by robots without human intervention. That is, the embodiments have been shown and described herein with relation to specific network configurations (orientations, topologies, protocols, terminology, etc.), devices, and physical configurations. However, the embodiments in their broader sense are not as limited, and may, in fact, be used with other types of networks, devices, hardware, protocols, and so on.

Furthermore, while the techniques herein generally refer to hardware and software, firmware, as will be appreciated in the art, is merely permanent software programmed into a read-only memory, thus for the techniques herein, is explicitly considered to be part of an installed (e.g., pre-installed) software configuration for a hardware device. That is, in certain embodiments, hardware with the proper firmware may be selected (e.g., hardware A with firmware version 1, versus hardware A with firmware version 2), while in other embodiments, the proper firmware may be installed as a software installation (e.g., selecting hardware A, and then installing or "flashing" firmware version 2 onto it). Also, while physical connections are often referred to (e.g., cables, blind mating, etc.), optical and wireless connections may also similarly be configured as various interconnections herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   maintaining, by a server, an index of a plurality of lab hardware components and a plurality of lab software components available to a lab environment;
   determining, by the server, a particular computer network outside of the lab environment to recreate;
   determining, by the server, a plurality of hardware components of the particular computer network;
   determining, by the server, interconnectivity of the plurality of hardware components of the particular computer network;
   determining, by the server, a plurality of software components installed on respective ones of the plurality of hardware components of the particular computer network;
   determining, by the server, configuration of the plurality of software components installed on respective ones of the plurality of hardware components of the particular computer network;
   interconnecting, by the server, a selected set of the plurality of lab hardware components within the lab environment according to the interconnectivity of the plurality of hardware components of the particular computer network;
   installing, by the server, certain of the plurality of lab software components on respective ones of the selected set of lab hardware components within the lab environment corresponding to the plurality of software components installed on respective ones of the plurality of hardware components of the particular computer network;
   configuring, by the server, the installed lab software components within the lab environment according to the configuration of the plurality of software components installed on respective ones of the plurality of hardware components of the particular computer network;
   operating, by the server, the installed lab software components on the interconnected lab hardware components within the lab environment to recreate operation of the particular computer network within the lab environment; and
   providing, by the server, information about the recreated operation of the particular computer network,
   wherein the operating of the installed lab software components on the interconnected lab hardware components within the lab environment to recreate operation of the particular computer network within the lab environment comprises:
      determining, using a machine learning model, a network metric corresponding to a problem occurring in the particular computer network, and
      controlling, by the server, test equipment or a load generator operatively coupled to the plurality of lab hardware components according to the determined network metric to mimic the problem occurring in the particular computer network within the lab environment.

2. The method as in claim 1, further comprising:
   determining a root cause of a problem in the particular computer network based on the information about the recreated operation of the particular computer network.

3. The method as in claim 1, wherein the plurality of lab hardware components are pre-connected to a lab switch within the lab environment, and wherein interconnecting the selected set of the plurality of lab hardware components within the lab environment comprises:
   establishing, through the lab switch, a virtualized interconnection between the selected set of the plurality of lab hardware components that mimics the interconnectivity of the plurality of hardware components of the particular computer network.

4. The method as in claim 1, wherein interconnecting the selected set of the plurality of lab hardware components within the lab environment comprises:
   interconnecting the selected set of the plurality of lab hardware components within the lab environment via a lab patch panel within the lab environment in a configuration that represents the interconnectivity of the plurality of hardware components of the particular computer network.

5. The method as in claim 4, wherein interconnecting comprises:
   providing visual guidance on the lab patch panel for a manual user to connect the selected set of the plurality of lab hardware components within the lab environment to the lab patch panel within the lab environment in a configuration that represents the interconnectivity of the plurality of hardware components of the particular computer network; and
   confirming the interconnecting of the selected set of the plurality of lab hardware components within the lab environment according to the interconnectivity of the plurality of hardware components of the particular computer network.

6. The method as in claim 4, wherein interconnecting comprises:
robotically interconnecting the selected set of the plurality of lab hardware components within the lab environment via the lab patch panel within the lab environment in a configuration that represents the interconnectivity of the plurality of hardware components of the particular computer network.

7. The method as in claim 1, wherein interconnecting the selected set of the plurality of lab hardware components within the lab environment comprises:
robotically retrieving a plurality of lab cartridges from storage for the lab environment, the plurality of lab cartridges collectively housing the selected set of the plurality of lab hardware components;
robotically inserting the plurality of lab cartridges into one or more racks within the lab environment; and
robotically interconnecting the plurality of lab cartridges via a lab patch panel within the lab environment in a configuration that interconnects the selected set of the plurality of lab hardware components within the lab environment according to the interconnectivity of the plurality of hardware components of the particular computer network.

8. The method as in claim 7, further comprising:
robotically returning the plurality of lab cartridges to storage upon completion of operating.

9. The method as in claim 7, further comprising:
selecting the plurality of lab cartridges to robotically insert based on one or both of pre-installed or pre-configured lab software components corresponding to the plurality of software components of the particular computer network.

10. The method as in claim 7, wherein robotically inserting the plurality of lab cartridges into one or more racks within the lab environment comprises:
blind mating one or more of a power element, a cooling element, a management element, and a network interconnect element of the plurality of lab cartridges with a corresponding element on the one or more racks.

11. The method as in claim 7, wherein one or more of the plurality of lab cartridges are closed cartridges encapsulating hardware components therein.

12. The method as in claim 7, wherein the lab environment is associated with a first entity, and wherein one or more of the plurality of lab cartridges are closed cartridges encapsulating hardware components associated with a second entity therein.

13. The method as in claim 7, further comprising:
determining, by the server, an optimal storage arrangement of the lab cartridge storage for the lab environment based on efficiency of configuring the lab environment to recreate operation of computer networks.

14. The method as in claim 7, wherein at least a portion of the plurality of lab cartridges are pre-inserted into one or more particular racks, and wherein robotically retrieving the plurality of lab cartridges from storage comprises robotically retrieving the particular racks with pre-inserted lab cartridges, and wherein robotically inserting the plurality of lab cartridges comprises robotically inserting the particular racks into the lab environment.

15. The method as in claim 7, further comprising:
robotically inserting one or more hardware sub-components into one or more of the plurality of lab cartridges.

16. The method as in claim 1, further comprising:
robotically pressing one or more buttons on the lab hardware within the lab environment while operating the installed lab software components on the interconnected lab hardware components within the lab environment to recreate operation of the particular computer network within the lab environment.

17. The method as in claim 1, further comprising:
adjusting one or more parameters of the lab environment selected from a group consisting of: interconnected lab hardware components; interconnection of the interconnected lab hardware components; installed lab software components; configuration of the installed lab software components; network traffic within the lab environment; software protocol messages; and command line interface (CLI) commands;
determining an effect of the adjusted one or more parameters on operation of the lab environment; and
providing information about the effect of the adjusted one or more parameters on operation of the lab environment.

18. A tangible, non-transitory, computer-readable medium storing program instructions that cause a computer to execute a process comprising:
maintaining an index of a plurality of lab hardware components and a plurality of lab software components available to a lab environment;
determining a particular computer network outside of the lab environment to recreate;
determining a plurality of hardware components of the particular computer network;
determining interconnectivity of the plurality of hardware components of the particular computer network;
determining a plurality of software components installed on respective ones of the plurality of hardware components of the particular computer network;
determining configuration of the plurality of software components installed on respective ones of the plurality of hardware components of the particular computer network;
interconnecting a selected set of the plurality of lab hardware components within the lab environment according to the interconnectivity of the plurality of hardware components of the particular computer network;
installing certain of the plurality of lab software components on respective ones of the selected set of lab hardware components within the lab environment corresponding to the plurality of software components installed on respective ones of the plurality of hardware components of the particular computer network;
configuring the installed lab software components within the lab environment according to the configuration of the plurality of software components installed on respective ones of the plurality of hardware components of the particular computer network;
operating the installed lab software components on the interconnected lab hardware components within the lab environment to recreate operation of the particular computer network within the lab environment; and
providing information about the recreated operation of the particular computer network,
wherein the operating of the installed lab software components on the interconnected lab hardware components within the lab environment to recreate operation of the particular computer network within the lab environment comprises:

determining, using a machine learning model, a network metric corresponding to a problem occurring in the particular computer network, and controlling test equipment or a load generator operatively coupled to the plurality of lab hardware components according to the determined network metric to mimic the problem occurring in the particular computer network within the lab environment.

19. The computer-readable medium as in claim 18, wherein the process further comprises:

determining a root cause of a problem in the particular computer network based on the information about the recreated operation of the particular computer network.

20. The computer-readable medium as in claim 18, wherein the process, when executed to interconnect the selected set of the plurality of lab hardware components within the lab environment comprises:

robotically retrieving a plurality of lab cartridges from storage for the lab environment, the plurality of lab cartridges collectively housing the selected set of the plurality of lab hardware components;

robotically inserting the plurality of lab cartridges into one or more racks within the lab environment; and robotically interconnecting the plurality of lab cartridges via a lab patch panel within the lab environment in a configuration that interconnects the selected set of the plurality of lab hardware components within the lab environment according to the interconnectivity of the plurality of hardware components of the particular computer network.

21. A system, comprising:

a plurality of lab hardware components available to a lab environment;

a plurality of lab software components available to the lab environment;

a server configured to determine:

a particular computer network outside of the lab environment to recreate;

a plurality of hardware components of the particular computer network;

interconnectivity of the plurality of hardware components of the particular computer network;

a plurality of software components installed on respective ones of the plurality of hardware components of the particular computer network; and a configuration of the plurality of software components installed on respective ones of the plurality of hardware components of the particular computer network; and a robotic system configured to interconnect, based on instruction by the server, a selected set of the plurality of lab hardware components within the lab environment according to the interconnectivity of the plurality of hardware components of the particular computer network;

wherein the server is further configured to:

install certain of the plurality of lab software components on respective ones of the selected set of lab hardware components within the lab environment corresponding to the plurality of software components installed on respective ones of the plurality of hardware components of the particular computer network;

configure the installed lab software components within the lab environment according to the configuration of the plurality of software components installed on respective ones of the plurality of hardware components of the particular computer network;

operate the installed lab software components on the interconnected lab hardware components within the lab environment to recreate operation of the particular computer network within the lab environment; and provide information about the recreated operation of the particular computer network, and wherein, when the server operates the installed lab software components on the interconnected lab hardware components within the lab environment to recreate operation of the particular computer network within the lab environment, the server is further configured to:

determine, using a machine learning model, a network metric corresponding to a problem occurring in the particular computer network; and control test equipment or a load generator operatively coupled to the plurality of lab hardware components according to the determined network metric to mimic the problem occurring in the particular computer network within the lab environment.

* * * * *

UNITED STATES PATENT AND TRADEMARK OFFICE
CERTIFICATE OF CORRECTION

PATENT NO. : 10,657,020 B2
APPLICATION NO. : 15/613481
DATED : May 19, 2020
INVENTOR(S) : Michael David Hanes et al.

Page 1 of 1

It is certified that error appears in the above-identified patent and that said Letters Patent is hereby corrected as shown below:

In the Specification

Column 10, Line 18, please amend as shown:
interface, requires 120V, 3A, and listing the set of features Column 10, Line 53, please amend as shown:
exist to get up to approximately 1KW into the cartridge.

Column 10, Line 54, please amend as shown:
These could be 120/240AC and 48VDC. Finally, there is a Column 10, Line 63, please amend as shown:
(perhaps the largest one holding equipment up to 8U in size, Column 10, Line 64, please amend as shown:
two medium ones holding equipment up to 4U, and three Column 10, Line 65, please amend as shown:
small ones holding equipment up to 2U). Lab Rack #2 holds Column 10, Line 66, please amend as shown:
one medium cartridge for equipment up to 4U, and nine Column 10, Line 67, please amend as shown:
small ones sized for 2U equipment. All these cartridges may Column 11, Line 31, please amend as shown:
"Things" in them. A medium sized (e.g., 4U) cartridge may Signed and Sealed this
Seventeenth Day of November, 2020

Andrei Iancu
*Director of the United States Patent and Trademark Office*